UNITED STATES PATENT OFFICE.

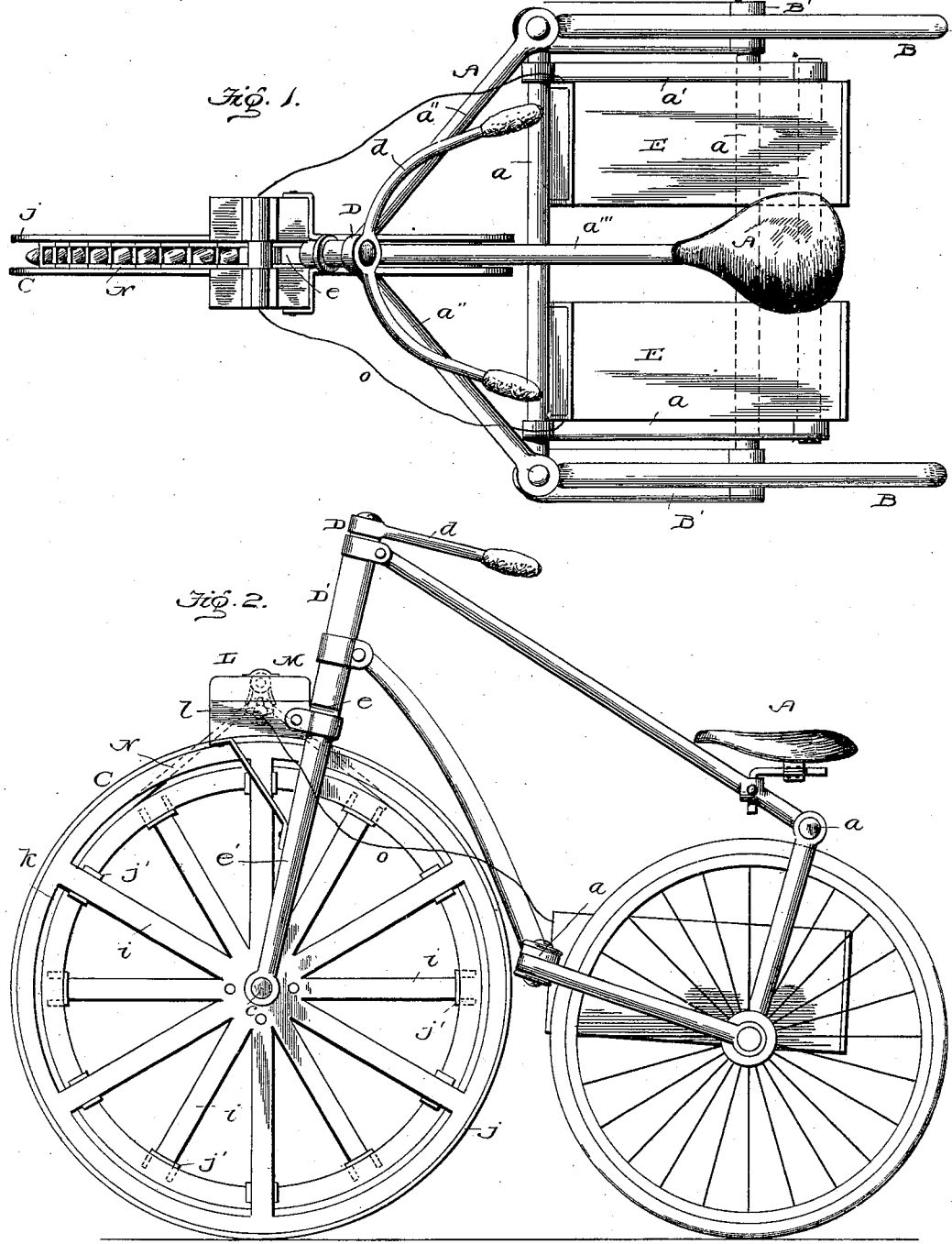

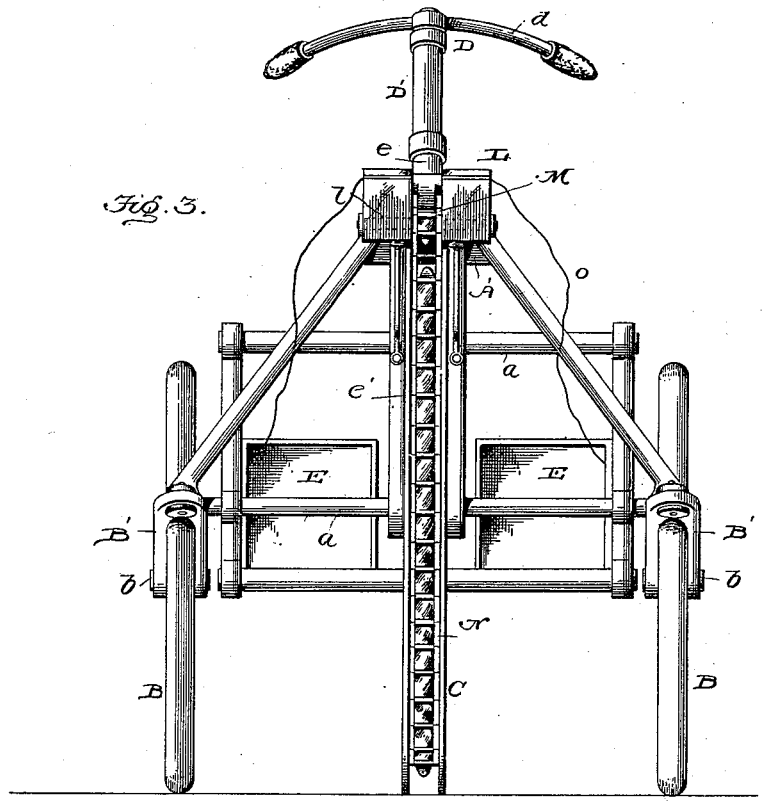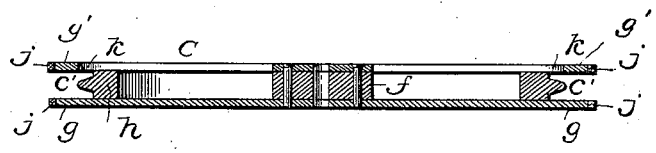

CHARLES H. BARROWS, OF WILLIMANTIC, CONNECTICUT.

MOTOR-VEHICLE.

SPECIFICATION forming part of Letters Patent No. 564,584, dated July 28, 1896.

Application filed July 6, 1895. Serial No. 555,154. (No model.)

*To all whom it may concern:*

Be it known that I, CHARLES H. BARROWS, a citizen of the United States, residing at Willimantic, in the county of Windham and State of Connecticut, have invented certain new and useful Improvements in Motor-Vehicles; and I do hereby declare the following to be a full, clear, and exact description of the invention, such as will enable others skilled in the art to which it appertains to make and use the same.

My invention relates to improvements in motor-vehicles, and the object in view is to provide a simple, light, and substantial construction in which the parts are compactly arranged in a manner to apply power to the front wheel, which is also the steering-wheel, of the vehicle.

In the preferred embodiment of the present invention the vehicle is a tricycle with a main carrying-frame equipped with one or more seats for the accommodation of the rider or riders and with receptacles for the electrical storage battery or batteries which furnish the energy for the motor. To the main frame are connected independent forked bars, and in each forked bar, of which there are two, is fitted one of the rear carrying-wheels, the short axle of said wheel being journaled in bearings provided therefor in the forked bar, whereby the rear wheels are independently journaled in separate forked bars attached to the main frame. At the front end of the main frame is a fixed tubular head, in which is fitted an upright steering-spindle, the upper end of said spindle having a handle-bar and the lower part of the spindle being bifurcated to accommodate the single front wheel of the vehicle. This front wheel is peculiarly constructed to render it available for service as the propelling-wheel for the vehicle in addition to serving as the steering-wheel for the guidance of the machine. Said wheel consists of a single hub, two parallel rims spaced a suitable distance from each other and having their spokes arranged alternately or in staggered relation to one another and said spokes rigidly united to the hub, suitable tires on the two rims, and a large driving sprocket-wheel arranged between the spaced rims and suitably united thereto, preferably by fastening the sprocket-wheel to the spokes of said parallel rims by means of clips, the whole being substantially built up.

The diameter of the sprocket-wheel is considerably less than the diameter of the two spaced rims, and said sprocket-wheel is secured to the spokes of the rims within the inner edges of the said rims to leave annular open spaces between the inner edges of the rims and the outer edges of the sprocket-wheel, through which spaces may be discharged any dirt, snow, &c., which may accumulate in the annular groove of the front wheel, whereby the front wheel is prevented from clogging to interfere with the action of the sprocket-chain.

My improved vehicle is equipped with an electric motor, which is carried or rigidly mounted on the head or upper end of the steering-fork, so that the motor will be adjusted with and partake of the adjustment of the steering-fork and the front wheel, in order to keep the motor-shaft in parallel relation to the action of said front wheel. This motor is a twin motor, with two sets of pole-pieces or field-magnets, two armatures, and a single shaft, and between these field-magnets and armatures is arranged a small sprocket-wheel, which is rigid with the motor-shaft. The employment of a twin motor enables me to mount it on the steering-head of the vehicle in a manner to balance itself so that the weight is equally distributed on both sides of the steering-head, and said twin motor also provides means for gearing the motor-shaft direct to the front wheel of the vehicle, thereby dispensing with a multiplicity of gearing between the motor-shaft and the front wheel. This motor and the front wheel are geared together by an endless sprocket-chain, which engages with the small and large sprockets secured to the motor-shaft and the front wheel, respectively, and by thus directly gearing the motor and front wheel together I am able to exert great leverage on the front wheel or transmit thereto nearly all of the power of the motor, besides reducing the high speed of the motor-shaft to the proper speed for a vehicle designed to carry one or more persons over roads or streets.

My improved vehicle also includes certain novel combinations of devices and peculiar construction and arrangement of parts, which will be hereinafter more fully described and claimed.

To enable others to understand my invention, I have illustrated the preferred embodiment thereof in the accompanying drawings, forming a part of this specification, and in which—

Figure 1 is a plan view of my improved motor-vehicle. Fig. 2 is a side elevation. Fig. 3 is a front elevation. Fig. 4 is a detail view of the front steering and propelling wheel.

Like letters of reference denote corresponding parts in all the figures of the drawings, referring to which—

A designates the main carrying-frame of my motor-vehicle.

B B are the rear carrying-wheels, and C is the front wheel, which serves both as the steering-wheel and as the propelling-wheel for the vehicle.

The main frame A may be constructed in any suitable way, having in view a light but strong frame, but in the form shown in the drawings. It comprises the transverse bars $a\ a\ a$, the vertical and inclined bars $a'\ a'$, and the reach-bars $a''\ a'''$, the latter being the "backbone" on which the saddle A' is mounted when the machine is designed to accommodate a single rider. As stated, the frame may be differently constructed and braced, and especially so when the vehicle is to carry two or more persons.

To the front end of the frame A, or rather to the reach-bars $a''\ a'''$, is securely joined the head D, which head receives and forms the journal for the steering-spindle D', the latter fitting loosely in the head D, so it can be turned freely therein. A handle-bar $d$ is fastened to the upper end of this steering-spindle, and at the lower end of said spindle is a cross-head $e$ and a fork $e'$, the latter accommodating the front wheel C, which has its axle $c$ journaled in suitable bearings at or near the lower extremities of the steering-fork $e'$.

The rear wheels B B are made similar to ordinary rubber-tired bicycle-wheels, and each rear wheel has a short axle $b$, which is journaled in bearings provided at the rear ends of a bifurcated or forked bar B', the wheel B fitting between the forks of said bar, as shown by Figs. 1 and 2. Two of these forked bars B' B' are provided for the accommodation of the two wheels B B, and one wheel and its bar are arranged in one side of the frame A, while the other wheel and bar are disposed on the opposite side of said frame A. These forked wheel-carrying bars B' B' are attached to the main frame A in any suitable manner, and I prefer to couple said bars B' to said main frame A in a way to permit each wheel B to turn with its own short axle when rounding curves or turning corners, so that there will be no more friction when the vehicle is turning corners than when pursuing a straight course. The main frame is also designed to carry the storage-batteries which furnish the currents of electrical energy for running the motor. The storage-battery cells are contained in the receptacle or receptacles E, which are rigidly secured to and between the bars $a$ of the main frame in any suitable way. I prefer to employ two of the receptacles E and to arrange them side by side and longitudinally of the frame A, so that ready access may be had to the rear ends of said receptacles at the rear end of the machine for the purpose of placing the cells in said receptacles or removing the cells therefrom.

The front wheel C of the machine is built up to form a central annular space or groove $c$ in the periphery of the wheel. Said wheel consists of the single transverse hub $f$, the rims $g\ g'$, and the sprocket-wheel or rim $h$. The rims $g\ g'$ are made of metal or other suitable material, and they have spokes $i\ i'$, which are fastened to the hub in a suitable way, the spokes $i$ of the rim $g$ alternating with the spokes $i'$ of the rim $g'$. These rims $g\ g'$ are spaced apart laterally a sufficient distance to accommodate the sprocket-wheel $h$ between the rims and their spokes, and said rims $g\ g'$ are arranged parallel to each other, so that their outer surfaces are in parallel planes or flush with each other. These rims $g\ g'$ are equipped with elastic tires $j$, preferably of rubber, and these tires may be of any suitable pattern or construction. The sprocket-wheel $h$, while made of large diameter, still is less in diameter than the rims $g\ g'$, so that the annular openings or spaces $k$ will be left between the inner edges of the rims $g\ g'$ and the outer edges of the sprocket-wheel $h$, through which spaces $k$ may be freely discharged any dirt, snow, &c., which may accumulate in the annular groove of the wheel C. This sprocket-wheel $h$ is rigidly fastened between and within the rims $g\ g'$ in a suitable way, preferably by means of clips $j'$, which embrace the spokes $i\ i'$ of the rims $g\ g'$, whereby a wheel is produced which is substantial and light in construction.

L designates the electric motor, which is mounted on or carried by the head $e$ of the steering-fork, so that the motor is adapted to partake of the adjustments of the spindle D', and the motor-shaft $l$ is held in parallel relation at all times to the axle $c$ of the front wheel in order that the motor-shaft and front wheel may be in gear at all times. This motor is of the "twin-motor" variety, with a divided field-magnet and a divided armature, and a single continuous shaft on which the armatures are mounted, and to this shaft is secured a small sprocket-pinion M, which is arranged between the field-magnets and armatures, as shown.

The motor-shaft and front wheel are geared together by means of an endless sprocket-chain N, which engages with the teeth of the large sprocket-wheel $h$ and small sprocket-pinion secured to the front wheel and motor-shaft, respectively. The motor may be of any suitable construction, and it is braced and held in a suitable way on the cross-head e of the steering-fork over the front wheel C, as shown.

The current from the storage-batteries in the compartments E is led to the motor L by the flexible conductors o, connected in a suitable way.

A suitable switch is provided for regulating the flow of electric current to the motor, which switch is under control of the rider to start and stop the machine. I prefer to provide ball-bearings throughout the machine.

It is thought that the operation of my new motor-vehicle will be readily understood from the foregoing description taken in connection with the drawings.

The speed of the vehicle is determined by making the sprocket-wheel h in proper proportion to the sprocket-pinion M. My motor-vehicle may be used for traveling over roads and streets, and it may also be so geared as to be well adapted for use in pacing riders in bicycle races.

While I have shown and described my vehicle as being equipped with a motor and storage-batteries for electrical propulsion, yet I do not confine myself to the use of electrical appliances for propelling the vehicle, as I am aware that the vehicle may be provided with a motor operated by gas or gasoline, compressed air, or steam.

Changes in the form and proportion of parts and in the details of construction herein shown and described as an embodiment of my invention may be made by a skilled mechanic without departing from the spirit or sacrificing the advantages of my invention, and I therefore reserve the right to make such modifications and alterations as fairly fall within the scope of my invention.

Having thus fully described my invention, what I claim as new, and desire to secure by Letters Patent, is—

1. In a motor-vehicle, the combination with a steering-spindle, and a steering and driving wheel carried by said spindle, of a rotary twin electric motor mounted on the spindle to have its weight distributed equally on opposite sides thereof, and direct gear connections between the motor-shaft and said driving-wheel, substantially as and for the purposes described.

2. In a motor-vehicle, the combination with a steering-spindle, of a front wheel having a driving-rim within the divided tread of the wheel, of a twin electric motor balanced on the steering-spindle and having a driving-pinion secured to its shaft between the divided field-magnets and armature, and a chain or belt which connects said driving-pinion and the driving-rim directly together, substantially as and for the purposes described.

3. In a motor-vehicle, the frame consisting of the steering-head, the laterally-diverging bars a', a'' joined to said head and connected to each other, and the forked rear bars joined to the bars a, a'', in combination with a steering-spindle carrying the front wheel, the rear wheels journaled in the forked rear bars, a rotary twin motor balanced on the steering-spindle, and direct gear connections between the motor-shaft and the front wheel, substantially as described.

4. In a motor-vehicle, the wheel C having the spaced rims and the propelling rim or wheel secured between said spaced rims and within the edges of the rims, said propelling rim or wheel forming lateral clearance-spaces between itself and the spaced rims, substantially as and for the purposes described.

In testimony whereof I affix my signature in presence of two witnesses.

CHARLES H. BARROWS.

Witnesses:
JOHN G. MITCHELL,
ALLEN B. LINCOLN.